United States Patent
Fujii

(10) Patent No.: US 9,553,622 B2
(45) Date of Patent: Jan. 24, 2017

(54) RECEPTION CIRCUIT AND COMMUNICATION SYSTEM

(71) Applicant: Kabushiki Kaisha Toshiba, Minato-ku, Tokyo (JP)

(72) Inventor: Shinsuke Fujii, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/845,802

(22) Filed: Sep. 4, 2015

(65) Prior Publication Data
US 2016/0226540 A1    Aug. 4, 2016

(30) Foreign Application Priority Data

Jan. 30, 2015   (JP) .................... 2015-017374

(51) Int. Cl.
*H04B 1/16* (2006.01)
*H04L 7/00* (2006.01)

(52) U.S. Cl.
CPC ............... *H04B 1/16* (2013.01); *H04L 7/0087* (2013.01)

(58) Field of Classification Search
USPC ............................... 375/318, 232; 324/750.3
See application file for complete search history.

(56) References Cited

U.S. PATENT DOCUMENTS

| | | | |
|---|---|---|---|
| 6,442,380 B1 | 8/2002 | Mohindra | |
| 8,598,898 B2 * | 12/2013 | Sul | G01R 31/31716 324/555 |
| 8,611,816 B2 | 12/2013 | Kuroda | |
| 2009/0034601 A1 * | 2/2009 | Shakiba | H04L 25/03885 375/232 |
| 2009/0206962 A1 * | 8/2009 | Chou | H04B 3/14 333/28 R |
| 2011/0201271 A1 | 8/2011 | Kuroda | |
| 2013/0308059 A1 | 11/2013 | Suzuki et al. | |
| 2014/0085951 A1 | 3/2014 | Kaeriyama et al. | |

OTHER PUBLICATIONS

Masum Hossain et al., "A 14-Gb/s 32 m W AC coupled receiver in 90-nm CMOS," 2007 Symposium on V/LSI Circuits Digest of Technical Papers, pp. 1-37.

* cited by examiner

*Primary Examiner* — Eva Puente
(74) *Attorney, Agent, or Firm* — White & Case LLP

(57) ABSTRACT

According to an embodiment, a reception circuit is configured to receive a reception signal from a transmission circuit through a receiving AC coupling element. The transmission circuit transmits a transmission signal through a transmitting AC coupling element. The receiving AC coupling element is AC coupled to the transmitting AC coupling element. The reception circuit includes a variable gain amplifier, a hysteresis circuit and a first control circuit. The variable gain amplifier is configured to amplify the reception signal with a variable gain to output an amplified signal. The hysteresis circuit has hysteresis in an input/output characteristic, and is configured to output an output signal according to the amplified signal. The first control circuit is configured to control the gain so that an amplitude of the amplified signal approximates a reference amplitude.

20 Claims, 16 Drawing Sheets

(COMPARATIVE EXAMPLE)

FIG. 5 (COMPARATIVE EXAMPLE)

RECEPTION CIRCUIT AND COMMUNICATION SYSTEM

CROSS REFERENCE TO RELATED APPLICATION

This application is based upon and claims the benefit of priority from the prior Japanese Patent Application No. 2015-017374 filed on Jan. 30, 2015 in Japan, the entire contents of which are incorporated herein by reference.

FIELD

Embodiments described herein relate generally to a reception circuit and a communication system.

BACKGROUND

A communication system including a transmission circuit that transmits a transmission signal through a transmitting inductor, and a reception circuit that receives a reception signal through a receiving inductor inductively coupled to the transmitting inductor is known. The reception circuit restores, from the received signal, a transmitted original data pattern.

In this communication system, an amplitude of the reception signal varies according to a voltage or a temperature, and the like. Therefore, the reception circuit may not be able to accurately restore the transmitted data pattern.

DETAILED DESCRIPTION

According to an embodiment, a reception circuit is configured to receive a reception signal from a transmission circuit through a receiving AC coupling element. The transmission circuit transmits a transmission signal through a transmitting AC coupling element. The receiving AC coupling element is AC coupled to the transmitting AC coupling element. The reception circuit includes a variable gain amplifier, a hysteresis circuit and a first control circuit. The variable gain amplifier is configured to amplify the reception signal with a variable gain to output an amplified signal. The hysteresis circuit has hysteresis in an input/output characteristic, and is configured to output an output signal according to the amplified signal. The first control circuit is configured to control the gain so that an amplitude of the amplified signal approximates a reference amplitude.

Embodiments will now be explained with reference to the accompanying drawings.

(First Embodiment)

Figure 1:
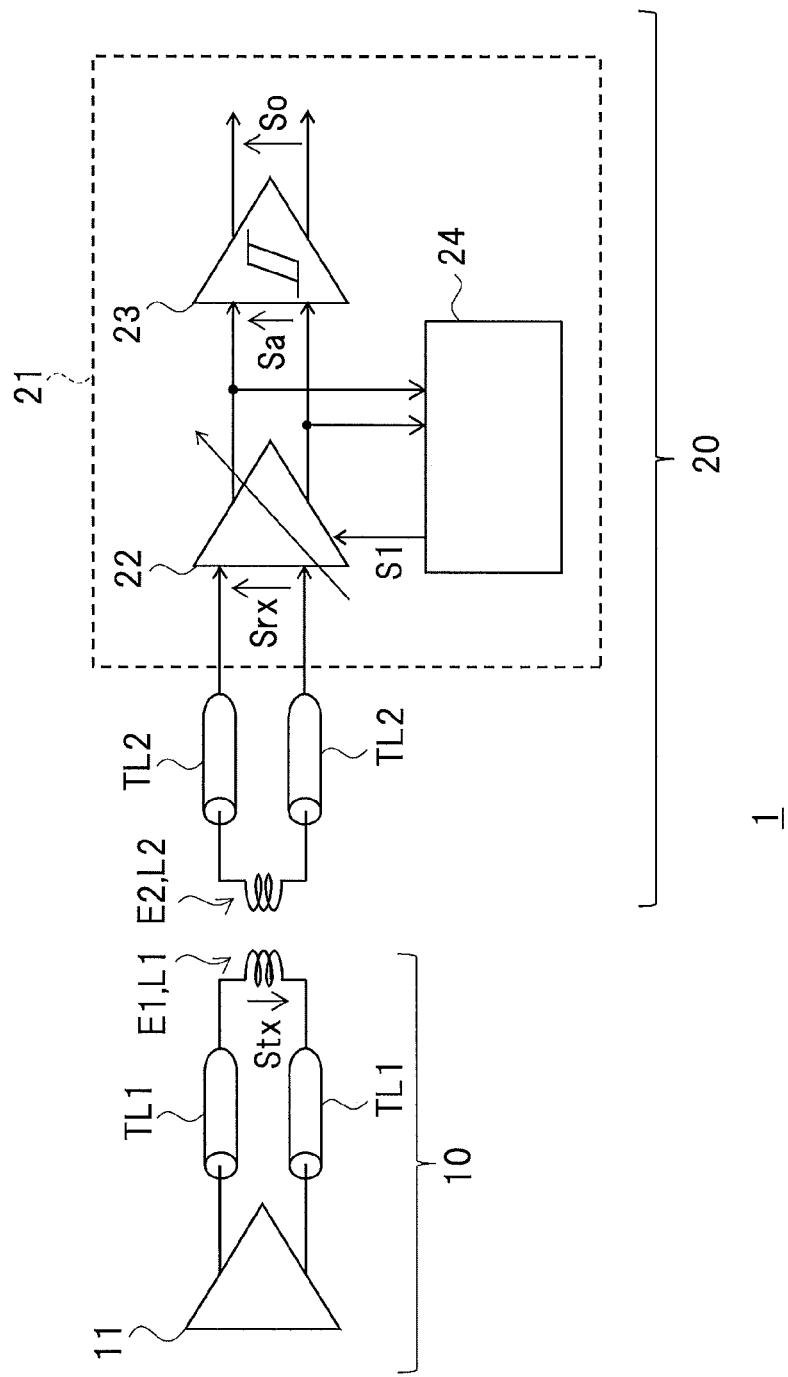
FIG. 1 is a block diagram illustrating a schematic configuration of a communication system according to a first embodiment.

FIG. 1 is a block diagram illustrating a schematic configuration of a communication system 1 according to a first embodiment. As illustrated in FIG. 1, the communication system 1 includes a transmitter 10 and a receiver 20. The transmitter 10 and the receiver 20 perform non-contact communication using AC coupling. Here, an example in which inductive coupling is used as the AC coupling will be described.

The transmitter 10 includes a transmitting AC coupling element E1, a pair of first transmission lines TL1 and TL1, and a transmission circuit 11. The transmitting AC coupling element E1 is a transmitting inductor L1. The transmitting inductor L1, the first transmission lines TL1 and TL1, and the transmission circuit 11 are provided on a printed circuit board of the transmitter 10, for example. The transmitting inductor L1 is a planar inductor, for example.

The first transmission lines TL1 and TL1 are microstriplines or the like, and connect the transmission circuit 11 and both ends of the transmitting inductor L1.

The transmission circuit 11 transmits a differential transmission signal Stx to a reception circuit 21 of the receiver 20 through the first transmission lines TL1 and TL1 and the transmitting inductor L1. Hereinafter, the differential signal will be described. However, a single-phase (single-end) signal may be used.

Here, the transmission signal Stx is a current flowing in the transmitting inductor L1. The transmission signal Stx is changed corresponding to a data pattern to be transmitted. For example, the transmission signal Stx in a period in which the data pattern is "1" is positive, and the transmission signal Stx in a period in which the data pattern is "0" is negative. A current in the direction of the arrow of FIG. 1 is positive. That is, when the data pattern is changed, the direction of the current flowing in the transmitting inductor L1 is changed.

The receiver 20 includes a receiving AC coupling element E2, a pair of second transmission lines TL2 and TL2, and the reception circuit 21. The receiving AC coupling element E2 is a receiving inductor L2. The receiving inductor L2, the second transmission lines TL2 and TL2, and the reception circuit 21 are provided on a printed circuit board of the receiver 20, for example. The receiving inductor L2 is a planar inductor, for example.

In performing communication, the transmitter 10 and the receiver 20 are closely arranged so that the transmitting inductor L1 and the receiving inductor L2 are close to each other. A distance between the transmitting inductor L1 and the receiving inductor L2 is several hundred μm, for example. With such an arrangement, the receiving inductor L2 is inductively coupled (AC coupled) to the transmitting inductor L1. Accordingly, a signal is transmitted from the transmitting inductor L1 to the receiving inductor L2 by electromagnetic induction.

The second transmission lines TL2 and TL2 are microstriplines or the like, and connect both ends of the receiving inductor L2 and the reception circuit 21.

The reception circuit 21 receives a differential reception signal Srx according to the transmitted transmission signal Stx through the receiving inductor L2 and the second transmission lines TL2 and TL2. The reception signal Srx is a voltage.

The reception circuit 21 includes a variable gain amplifier 22, a hysteresis circuit (hysteresis buffer) 23, and a first control circuit 24.

The variable gain amplifier 22 amplifies the reception signal Srx with a variable gain, and outputs an amplified signal Sa. The gain is controlled by the control signal S1.

The hysteresis circuit 23 has hysteresis in input/output characteristics, and outputs an output signal So according to the amplified signal Sa. The hysteresis circuit 23 compares the amplified signal Sa, a first threshold voltage Vth, and a second threshold voltage (−Vth) lower than the first threshold voltage Vth, and outputs the output signal So according to a comparison result. To be specific, the hysteresis circuit 23 outputs a "H" (high level) output signal So when the amplified signal Sa is changed to the positive first threshold voltage Vth or more, and outputs a "L" (low level) output signal So when the amplified signal Sa is changed to the negative second threshold voltage (−Vth) or less.

The first control circuit 24 controls the gain of the variable gain amplifier 22 with the control signal S1 so that an amplitude of the amplified signal Sa approximates a reference amplitude Aref in a period in which no communication is performed such as before the start of the communication. That is, the variable gain amplifier 22 and the first control circuit 24 configure an automatic gain control circuit (AGC circuit).

Figure 2:
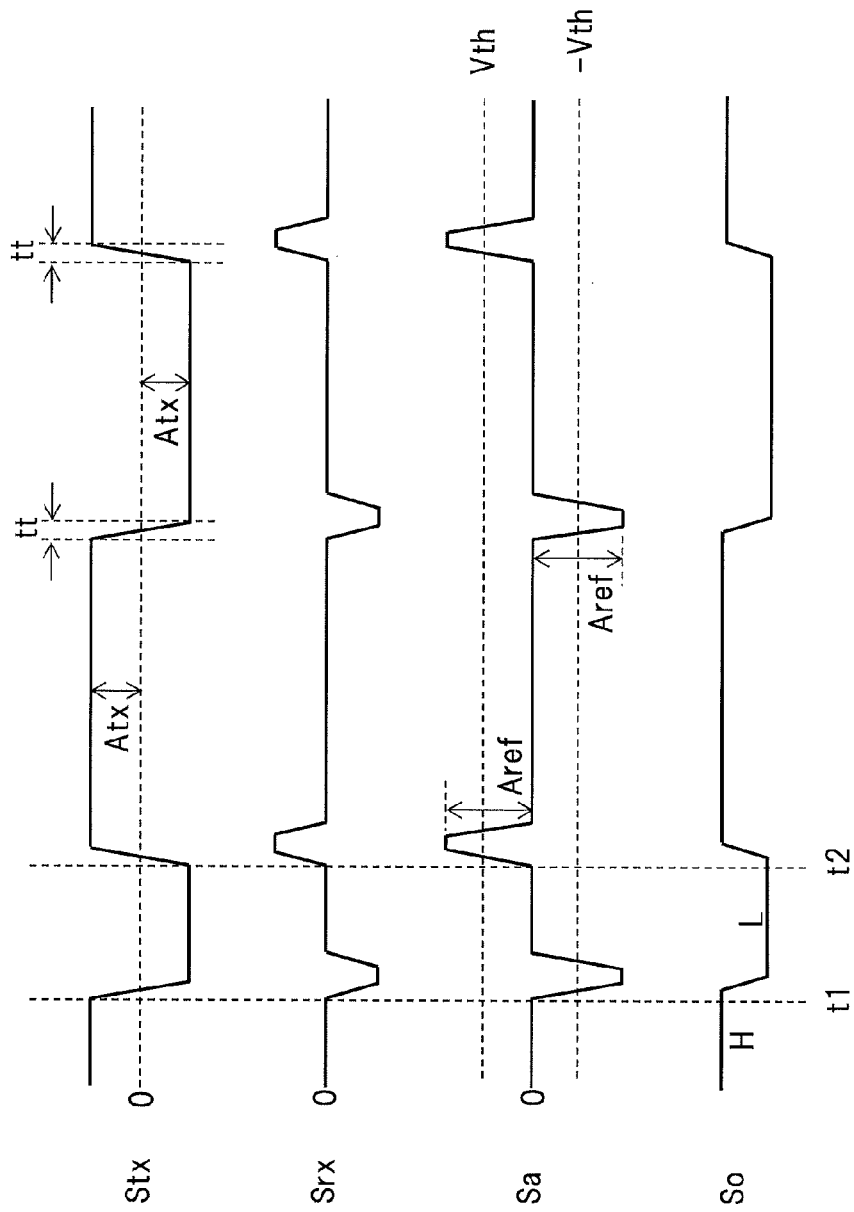
FIG. 2 is a timing chart of the communication system of FIG. 1.

FIG. 2 is a timing chart of the communication system 1 of FIG. 1. FIG. 2 illustrates ideal waveforms for clarification of description. Further, the gain of the variable gain amplifier 22 is a fixed value.

The transmission signal Stx as a current is decreased at a time t1, and is changed from positive to negative. Accordingly, a negative pulse is caused in the reception signal Srx and the amplified signal Sa. Therefore, the amplified signal Sa becomes the second threshold voltage (−Vth) or less, so that the output signal So is changed from "H" to "L".

Next, the transmission signal Stx is increased at a time t2, and is changed from negative to positive. Accordingly, a positive pulse is caused in the reception signal Srx and the amplified signal Sa. Therefore, the amplified signal Sa becomes the first threshold voltage Vth or more, so that the output signal So is changed from "L" to "H".

The communication system 1 similarly operates at the time t2 and a subsequent time, and the reception circuit 21 can obtain the output signal So equal to a data pattern transmitted by the transmission signal Stx.

By the way, amplitudes of the reception signal Srx and the amplified signal Sa vary due to various causes. The amplitude of the reception signal Srx varies according to an amplitude Atx of the transmission signal Stx (FIG. 2), a transition time tt of a signal level of the transmission signal Stx (FIG. 2), a coupling coefficient of the transmitting inductor L1 and the receiving inductor L2, and the like. The amplitude of the amplified signal Sa also varies due to the variation of the amplitude of the reception signal Srx.

The amplitude Atx of the transmission signal Stx and the transition time tt vary according to a manufacturing process of a circuit, a power source voltage, a temperature, mismatching of a circuit, and the like.

The coupling coefficient varies according to the distance between the transmitting inductor L1 and the receiving inductor L2.

When the amplitude Atx is relatively small, when the transition time tt is relatively long, and when the coupling coefficient is relatively small, the amplitude of the reception signal Srx becomes relatively small.

When the amplitude Atx is relatively large, when the transition time tt is relatively short, and when the coupling coefficient 25, is relatively large, the amplitude of the reception signal Srx becomes relatively large.

Figure 3:
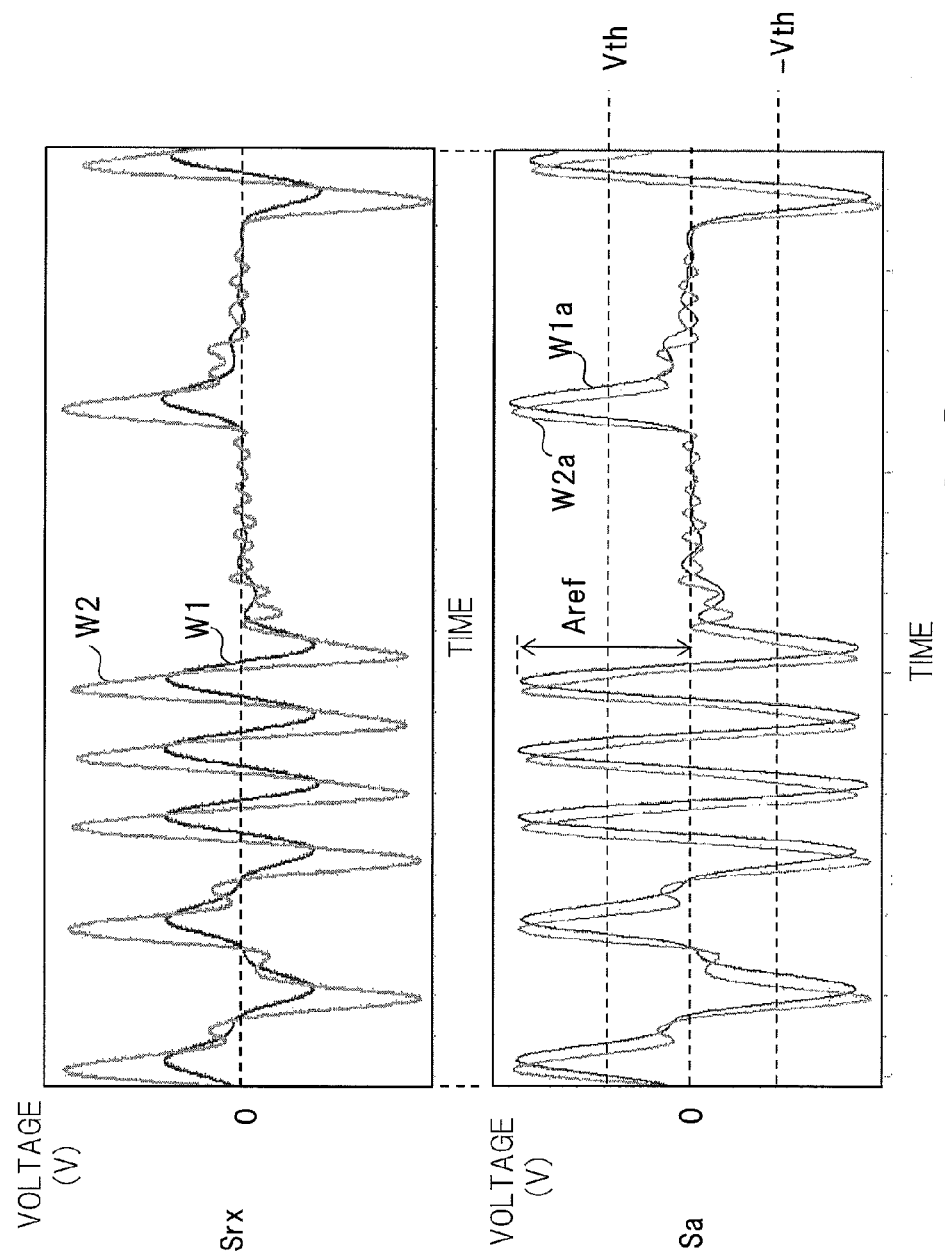
FIG. 3 is waveform diagrams of a reception signal Srx and an amplified signal Sa after a gain of the communication system of FIG. 1 is controlled.

FIG. 3 is waveform diagrams of the reception signal Srx and the amplified signal Sa after a gain of the communication system 1 of FIG. 1 is controlled. FIG. 3 illustrates a waveform W1 of the reception signal Srx of when the amplitude is small, a waveform W2 of the reception signal Srx of when the amplitude is large, a waveform W1a of the amplified signal Sa corresponding to the waveform W1, and a waveform W2a of the amplified signal Sa corresponding to the waveform W2. FIG. 3 illustrates waveforms including noises and the like, which is different from FIG. 2.

As described above, the first control circuit 24 controls the gain of the variable gain amplifier 22 so that the amplitude of the amplified signal Sa approximates the reference amplitude Aref. Therefore, as illustrated in FIG. 3, after the gain is controlled, the amplitude of the amplified signal Sa becomes nearly constant regardless of the amplitude of the reception signal Srx.

Figure 4:
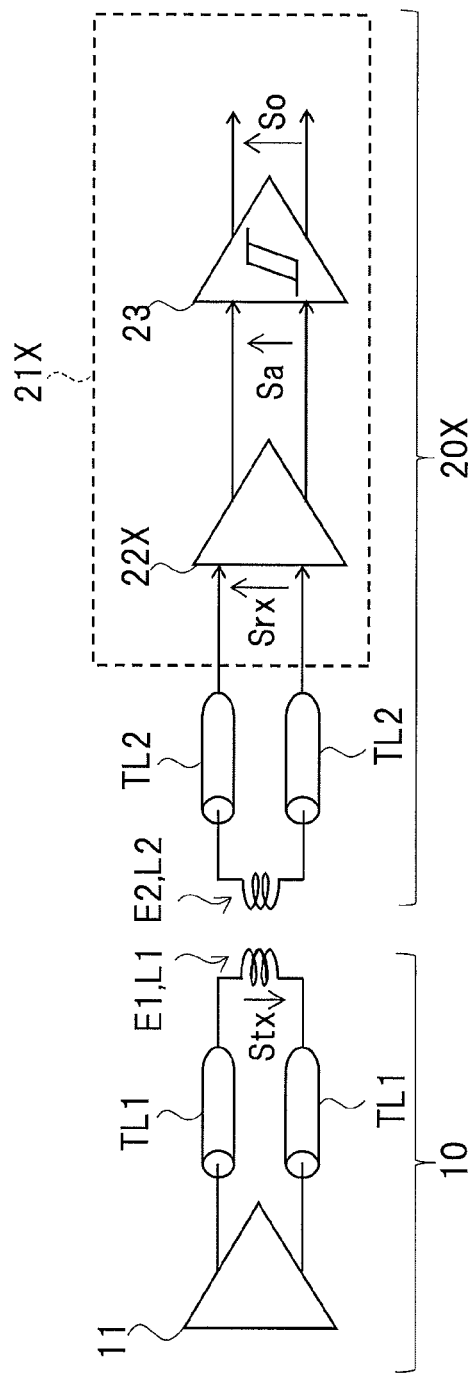
FIG. 4 is a block diagram illustrating a schematic configuration of a communication system of a comparative example.

Here, a communication system 1X of a comparative example will be described. FIG. 4 is a block diagram illustrating a schematic configuration of the communication system 1X of the comparative example. The communication system 1X of the comparative example is different from FIG. 1 in that a first control circuit 24 is not provided in a reception circuit 20X, and an amplifier 22X having a predetermined gain is provided in place of the variable gain amplifier 22.

Figure 5:
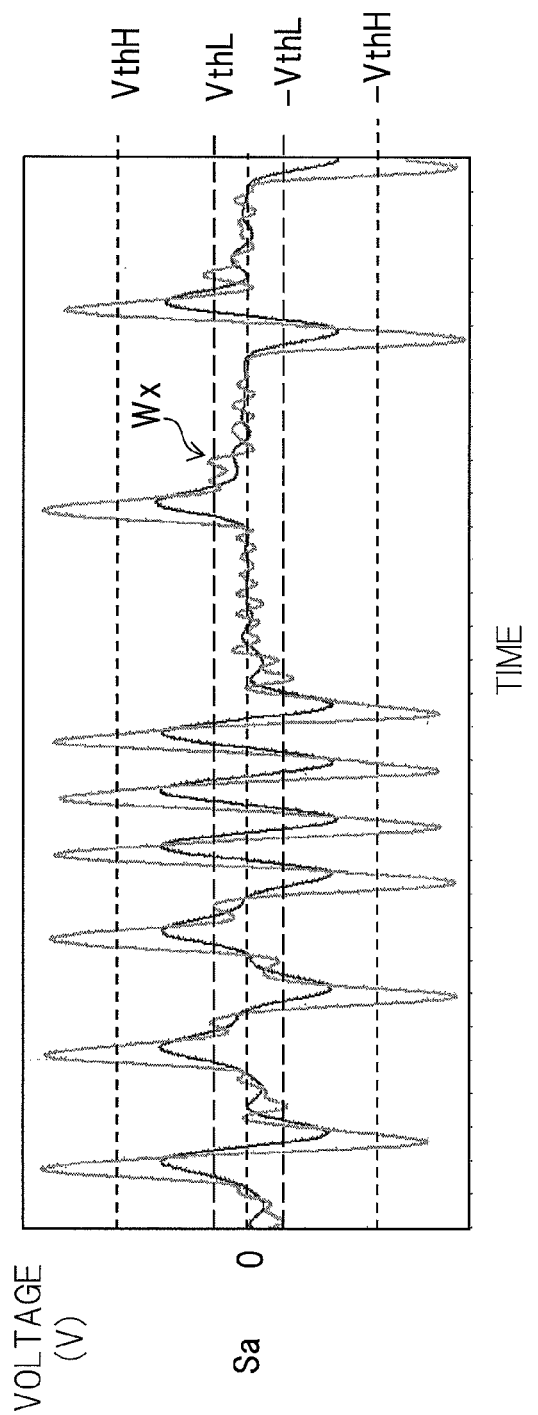
FIG. 5 is a waveform diagram of an amplified signal Sa of the communication system of the comparative example.

FIG. 5 is a waveform diagram of an amplified signal Sa of the communication system 1X of the comparative example. An amplitude of the amplified signal Sa varies according to variation of an amplitude of a reception signal Srx. Further, the amplitude of the amplified signal Sa also varies according to variation of the gain of the amplifier 22X.

Therefore, when the amplitude of the amplified signal Sa is large, absolute values of an optimum value VthH of a first threshold voltage and an optimum value (−VthH) of a second threshold voltage become large. The optimum value VthH of the first threshold voltage is a value larger than an unnecessary wave Wx such as a noise or a reflected wave, and smaller than the amplitude of the amplified signal Sa. The same applies to the optimum value (−VthH) of the second threshold voltage. When the amplitude of the amplified signal Sa is large, the unnecessary wave Wx is also large. Therefore, in this case, if the absolute values of the first threshold voltage and the second threshold voltage are too small, and are smaller than the unnecessary wave Wx, an output signal So is changed based on the unnecessary wave Wx, and a transmitted output pattern may not be able to be accurately restored.

When the amplitude of the amplified signal Sa is small, the absolute values of an optimum value VthL of the first threshold voltage and an optimum value (−VthL) of the second threshold voltage become small. Therefore, in this case, if the absolute values of the first threshold voltage and the second threshold voltage are too large, and are larger than the amplitude of the amplified signal Sa, the output signal So cannot be changed, and thus the transmitted data pattern cannot be restored.

As described above, in the reception circuit 20X of the comparative example, the optimum first threshold voltage Vth and second threshold voltage (−Vth) depend on the amplitude of the amplified signal Sa. Therefore, a hysteresis circuit 23 having constant first threshold voltage Vth and second threshold voltage (−Vth) may not be able to accurately restore the transmitted data pattern if the amplitudes of the reception signal Srx and the amplified signal Sa are changed.

In contrast, according to the present embodiment, the gain of the variable gain amplifier 22 is controlled so that the amplitude of the amplified signal Sa approximates the reference amplitude Aref. Therefore, even if the amplitude of the reception signal Srx is changed, the amplitude of the amplified signal Sa input to the hysteresis circuit 23 becomes nearly constant. Therefore, the optimum first threshold voltage Vth and second threshold voltage (−Vth) do not depend on the amplitude of the reception signal Srx. Therefore, the hysteresis circuit 23 can output the optimum output signal So even if the amplitude of the reception signal Srx is changed. Therefore, the transmitted data pattern can be more accurately restored.

(Second Embodiment)

In a second embodiment, a gain of a variable gain amplifier 22 is controlled using an output signal So.

Figure 6:
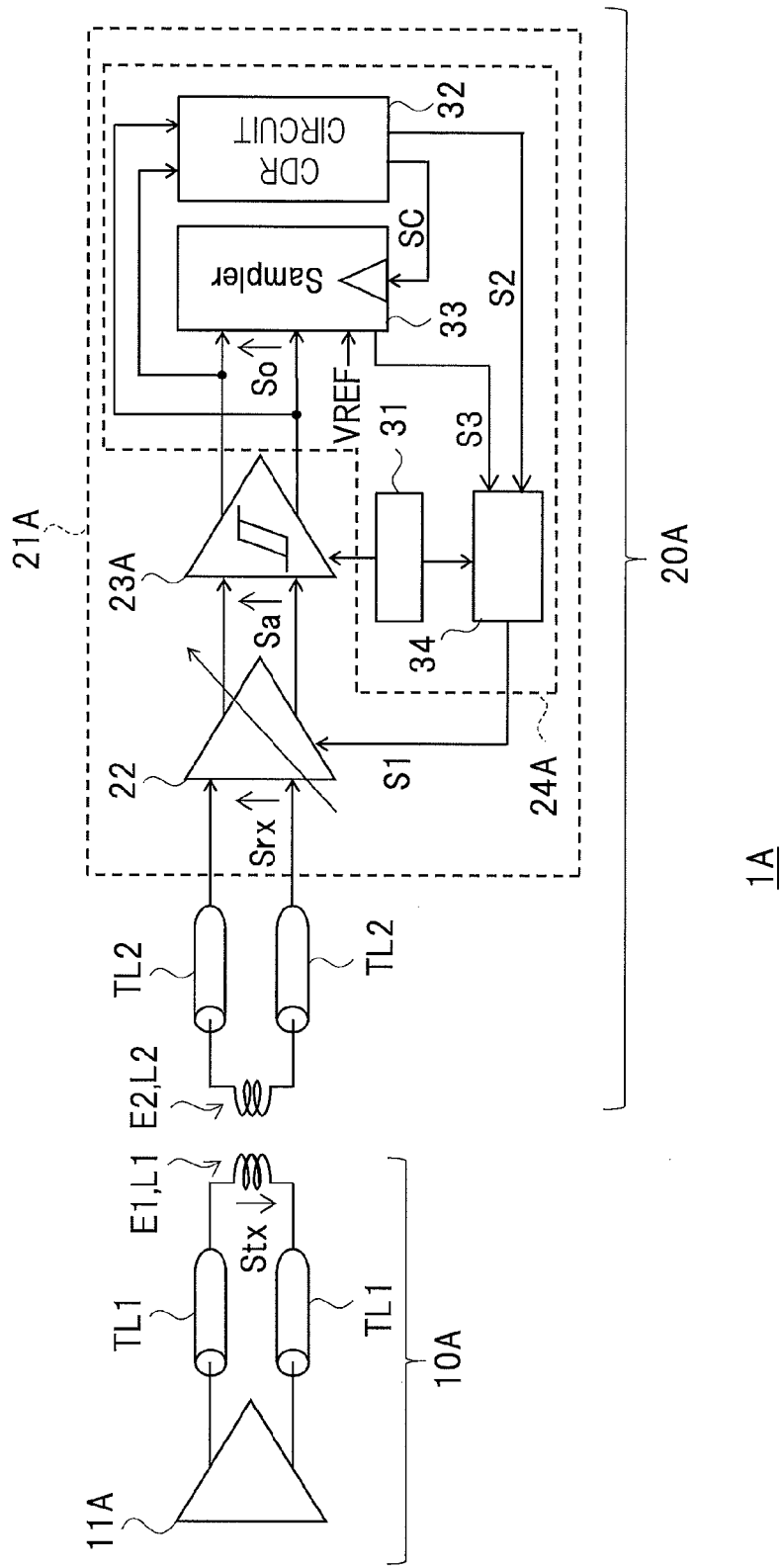
FIG. 6 is a block diagram illustrating a schematic configuration of a communication system according to a second embodiment.

FIG. 6 is a block diagram illustrating a schematic configuration of a communication system 1A according to the second embodiment. In FIG. 6, a configuration part common to FIG. 1 is denoted with the same reference sign, and hereinafter, different points will be mainly described.

A transmission circuit 11A of a transmitter 10A transmits a transmission signal Stx having a clock pattern of a period Tc, during a predetermined control period for controlling a gain. A duty ratio of the clock pattern is about 50%. A reception circuit 21A controls the gain, based on the transmission signal Stx having the clock pattern.

A hysteresis circuit 23A can switch a first state and a second state. An input/output characteristic has hysteresis in the first state. The input/output characteristic does not have hysteresis, and the hysteresis circuit 23A outputs an output signal So having an amplitude according to an amplitude of an amplified signal Sa, in the second state. A function in the first state is similar to that of the hysteresis circuit 23 of FIG. 1. For example, the hysteresis circuit 23A may function as a buffer circuit having a gain of nearly 1, in the second state. The second state is provided to obtain a value according to the amplified signal Sa, by sampling the output signal So in the control period. In the first state, the output signal So is an "L" or "H" binary signal, and a value according to the amplified signal Sa cannot be obtained even if the output signal So is sampled. Therefore, the second state is provided.

A first control circuit 24A controls the gain of the variable gain amplifier 22 so that the amplitude of the amplified signal Sa approximates a reference amplitude Aref, similarly to the first embodiment.

The first control circuit 24A includes a second control circuit 31, clock data recovery circuit (hereinafter, referred to as CDR circuit) 32, a sampler 33, and a third control circuit 34.

The second control circuit 31 switches the hysteresis circuit 23A to the second state during the control period. The second control circuit 31 switches the hysteresis circuit 23A to the first state in a period other than the control period. Therefore, the output signal So similar to the first embodiment can be obtained in the period other than the control period.

The CDR circuit 32 generates an internal clock signal synchronized with the output signal So, and delays the internal clock signal to generate a sampling clock signal SC. The internal clock signal is "H" when the output signal So is 0 V or more, and "L" when the output signal So is less than 0 V. Further, the CDR circuit 32 generates a polarity signal S2 that indicates whether the output signal So at each timing of a rising edge and a falling edge of the sampling clock signal SC is positive or negative.

The sampler 33 samples the output signal So in synchronization with the sampling clock signal SC, compares a sampled value and a reference voltage VREF according to the reference amplitude Aref, and outputs a comparison result S3. To be specific, the sampler 33 samples the output signal So according to the rising edge and the falling edge of the sampling clock signal SC. When a gain of the hysteresis circuit 23A in the second state is nearly 1, the reference voltage VREF is nearly equal to the reference amplitude Aref.

The third control circuit 34 supplies a control signal S1 to the variable gain amplifier 22 to control the gain in accordance with the comparison result S3. The third control circuit 34 controls the gain in accordance with the comparison result S3 of when the output signal So is positive, based on the polarity signal S2. Accordingly, the gain can be properly controlled, excluding the comparison result S3 of when the output signal So is negative. This is because, when the output signal So is negative, a value of the sampled output signal So is always smaller than the reference voltage VREF, and thus the comparison result S3 of when the output signal So is negative is not changed according to the value of the output signal So.

An optimum value exists in the period Tc of the clock pattern. The optimum value of the period Tc of the clock pattern is a period Tc in which the output signal So is maximized in 0.5 UI. "UI" represents unit interval.

Figure 7:
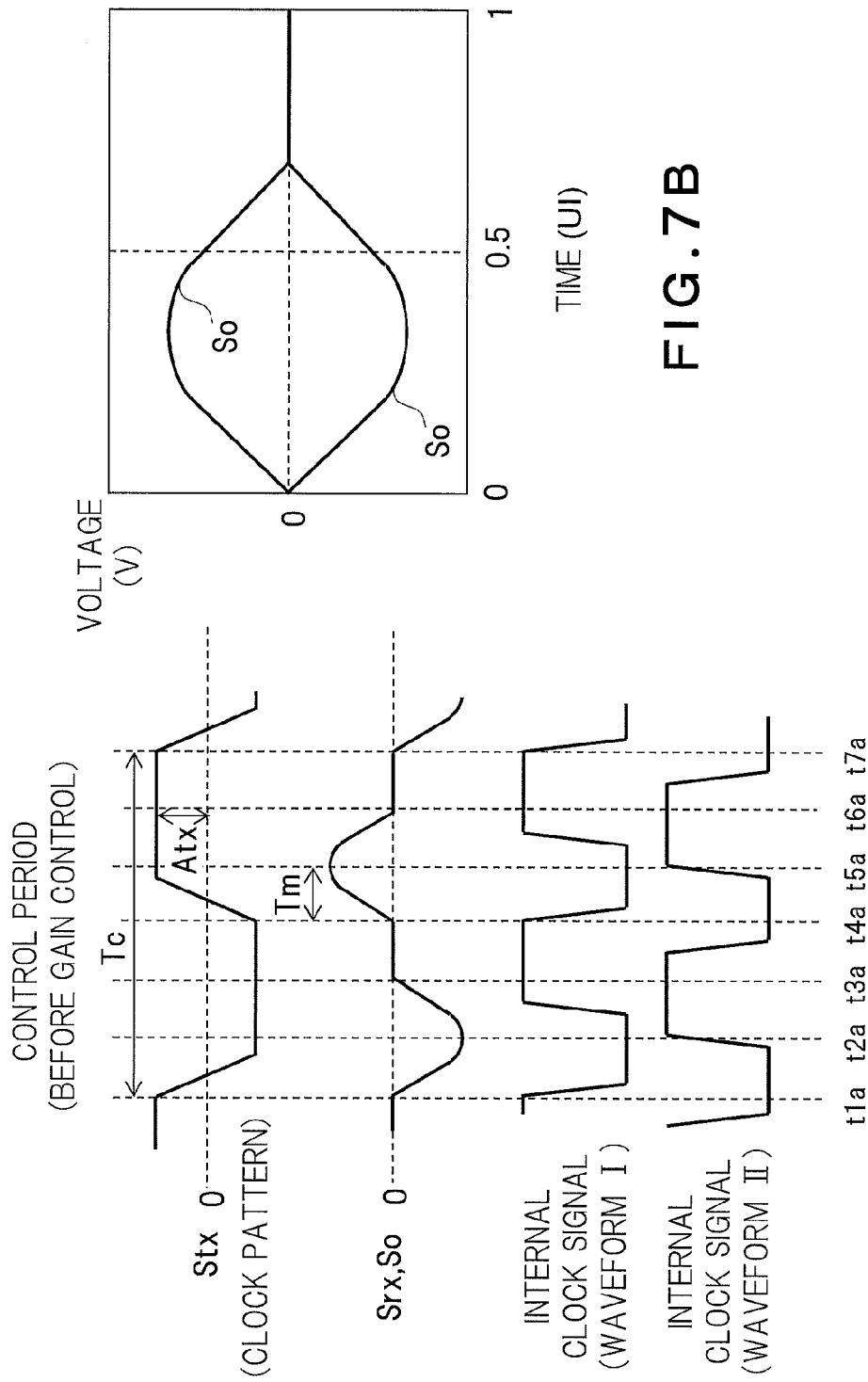
FIG. 7A is a timing chart of the communication system of FIG. 6 of when a period of a clock pattern is longer than an optimum value, before gain control in a control period.
FIG. 7B is a diagram illustrating an eye pattern of an output signal corresponding to FIG. 7A.

FIG. 7A is a timing chart of the communication system 1A of FIG. 6 of when the period Tc of the clock pattern is longer than the optimum value, before gain control in the control period. FIG. 7B is a diagram illustrating an eye pattern of the output signal So corresponding to FIG. 7A.

As described in the first embodiment with reference to FIG. 2, a signal is transmitted through inductive coupling, and thus a pulse is generated in a reception signal Srx according to the rising edge and the falling edge of the transmission signal Stx. As illustrated in FIG. 7A, a time Tm from the rising edge of the transmission signal Stx (clock pattern) to when the pulse of the reception signal Srx is maximized is determined according to an amplitude Atx of the transmission signal Stx and the like, and does not depend on the period Tc of the clock pattern. Therefore, a ratio of the time Tm to the period Tc becomes smaller as an increase in the period Tc. Further, in the second state, the reception signal Srx and the output signal So are nearly equal. Therefore, in the control period in which the hysteresis circuit 23A is in the second state, timing (UI) when the output signal So is maximized during one period of the output signal So is changed according to the period Tc of the clock pattern.

As illustrated in FIG. 7B, the timing when the output signal So is maximized gets closer to 0 UI, as the period Tc of the clock pattern is longer than the optimum value, and the output signal So becomes 0 before 1 UI, and then keeps 0 until 1 UI. In this case, the CDR circuit 32 may change the internal clock signal from "H" to "L" in timing (times t1a, t4a, and t7a) when the output signal So is changed from 0, as illustrated in FIG. 7A (waveform I). Further, the CDR circuit 32 may change the internal clock signal from "H" to "L" at timing near the middle of a period (times t3a to t4a, and t6a to t7a) in which the output signal So keeps 0 (waveform II). As described above, by the existence of the period in which the output signal So keeps 0 (times t3a to t4a, and t6a to t7a), the waveform of the internal clock signal is not constant, and the waveform I and the waveform II may be alternately repeated. Therefore, when the waveform of the internal clock signal is changed as described above, since the CDR circuit 32 delays the internal clock signal to generate the sampling clock signal SC, the timing of the rising edge and the falling edge of the sampling clock signal SC cannot be controlled. Therefore, the sampling cannot be performed at the timing when the output signal So is maximized.

Figure 8:
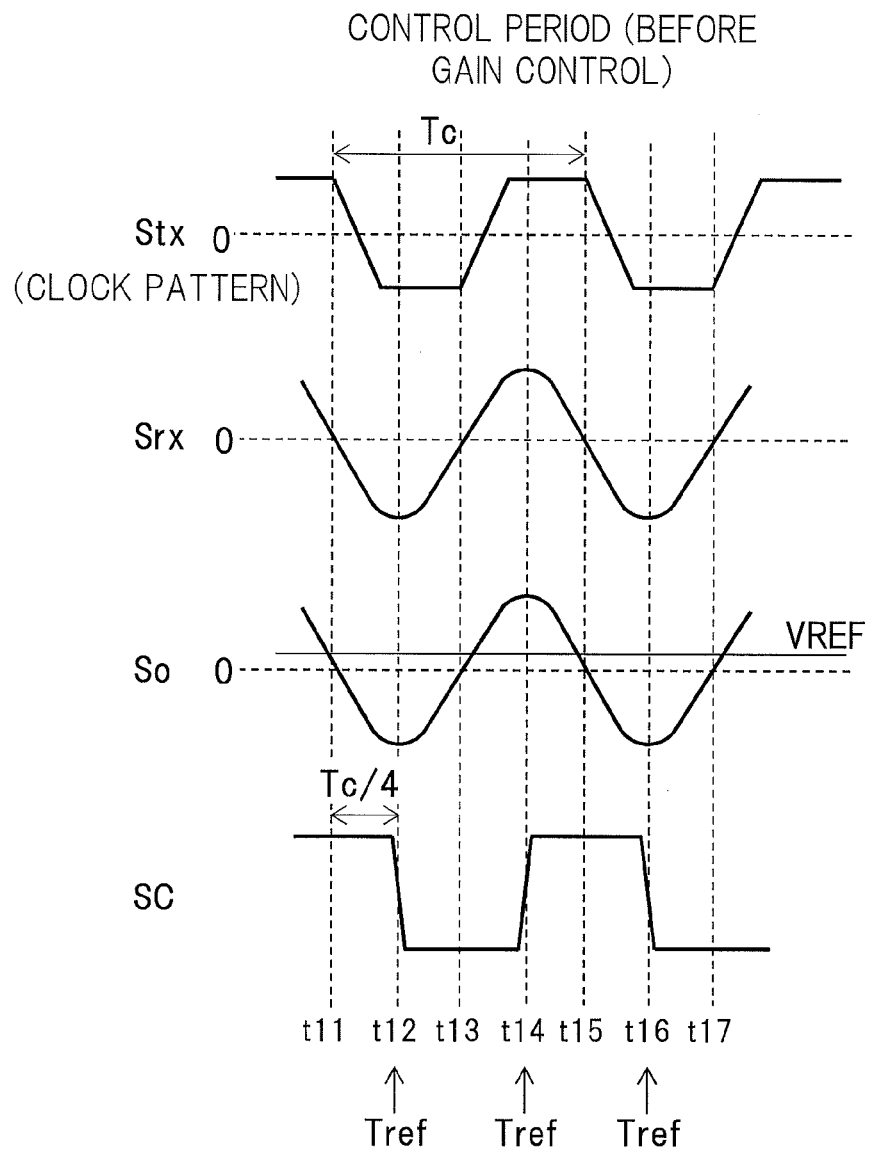
FIG. 8 is a timing diagram of the communication system of FIG. 6 before gain control in the control period.
Figure 9A:
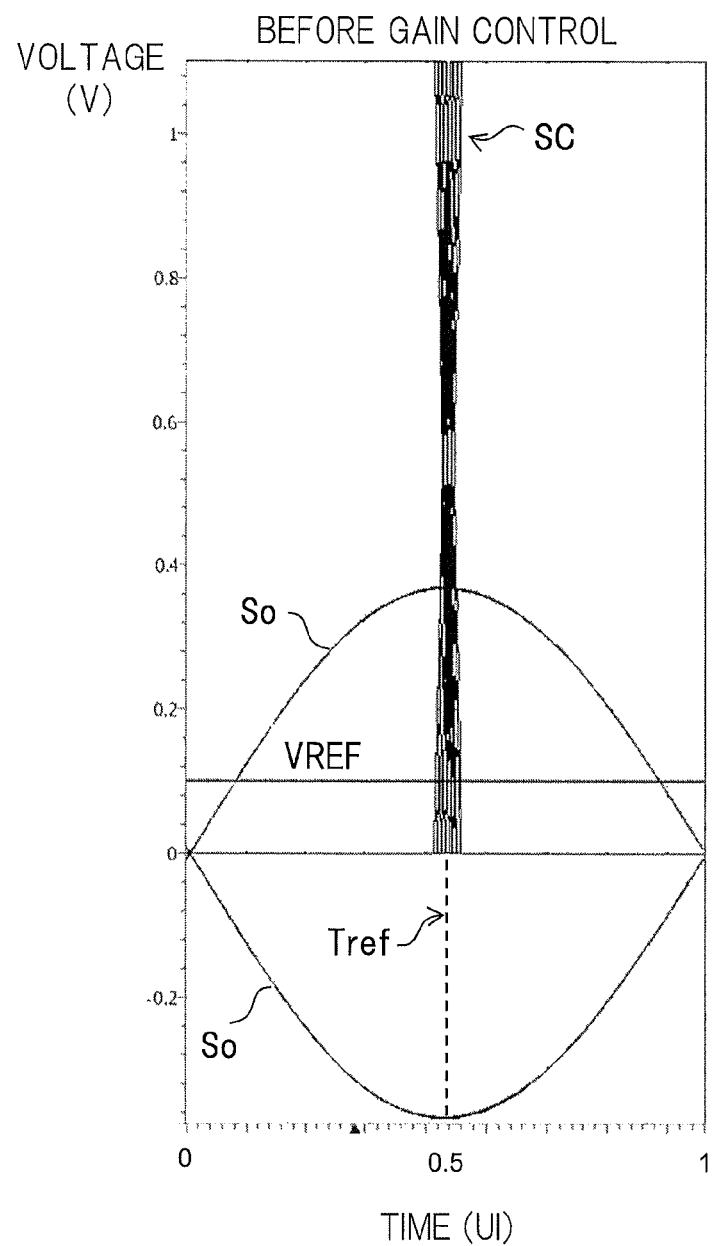
FIG. 9A is a diagram illustrating eye patterns of respective signals of a reception circuit of FIG. 6 before gain control in the control period.
Figure 9B:
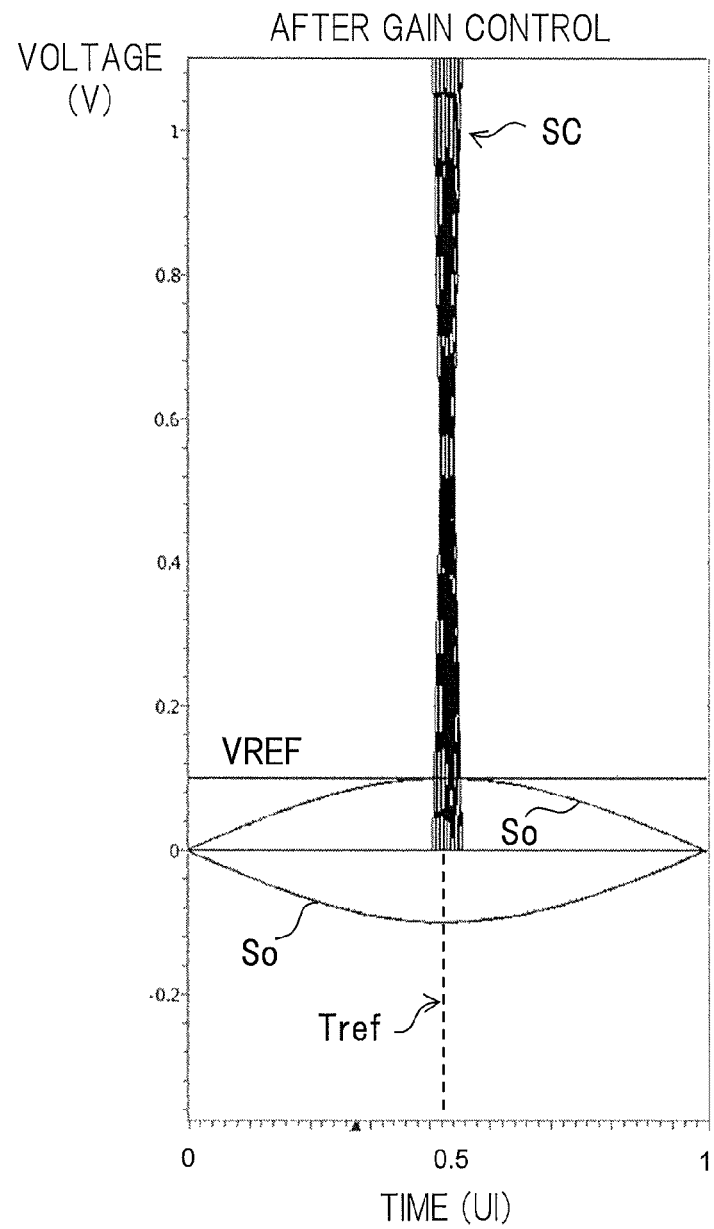
FIG. 9B is a diagram illustrating eye patterns of respective signals of the reception circuit of FIG. 6 after gain control in the control period.

Therefore, in the present embodiment, as illustrated in FIGS. 8, 9A and 9B, the period Tc of the clock pattern is determined so that timing when the output signal So is maximized approximates reference timing Tref (0.5 UI).

FIG. 8 is a timing diagram of the communication system 1A of FIG. 6 before gain control in the control period.

FIG. 9A is a diagram illustrating eye patterns of respective signals of the reception circuit 21A of FIG. 6 before gain control in the control period. That is, FIG. 9A corresponds to FIG. 8. FIG. 9B is a diagram illustrating eye patterns of respective signals of the reception circuit 21A of FIG. 6 after gain control in the control period. The reference timing Tref is timing after elapse of a ¼ time of the period Tc of the clock pattern, from timing when the output signal So is shifted from zero (times t11, t13, t15, and t17 of FIG. 8 and 0 UI of FIGS. 9A and 9B). That is, the reference timing Tref is timing of times t12, t14, and t16 of FIG. 8, and timing of 0.5 UI of FIGS. 9A and 9B.

Accordingly, the output signal So becomes 0 roughly in 0 UI and 1 UI. Therefore, even if the hysteresis circuit 23A is in the second state, the CDR circuit 32 can generate the internal clock signal of the period Tc and the sampling clock signal SC. Therefore, the timing of the riding edge and the falling edge of the sampling clock signal SC can be controlled.

The CDR circuit 32 delays the internal clock signal (not illustrated) so that the timing of the rising edge and the falling edge of the sampling clock signal SC approximates the reference timing Tref. Accordingly, around a maximum value of the output signal So can be sampled. Therefore, a more accurate amplitude can be obtained. Therefore, the gain can be more accurately controlled.

In FIGS. 8 and 9A, the value of the sampled output signal So is larger than the reference voltage VREF, and thus the gain of the variable gain amplifier 22 is decreased afterward.

Meanwhile, although not illustrated, when the value of the sampled output signal So is smaller than the reference voltage VREF, the gain of the variable gain amplifier 22 is increased.

As described above, a plurality of times of sampling and comparison is performed, and the increase and the decrease in the gain of the variable gain amplifier 22 are repeated, so that the maximum value of the output signal So can be caused to approximate the reference voltage VREF, as illustrated in FIG. 9B.

The gain may be changed for each rising edge of the sampling clock signal SC. Accordingly, the gain can be controlled in a short time.

When the control period ends, the second control circuit 31 stops the operation of the third control circuit 34, and terminates the control of the gain. Accordingly, the amplitude of the amplified signal Sa becomes nearly constant regardless of the amplitude of the reception signal Srx.

Therefore, the same effect as the first embodiment can be obtained.

Note that the sampler 33 may sample the output signal So only according to the rising edge of the sampling clock signal SC. In this case, the gain can be controlled without using the polarity signal S2.

(Third Embodiment)

A third embodiment is different from the second embodiment in that a plurality of reference voltages VREF1 to VREFn is used.

Figure 10:
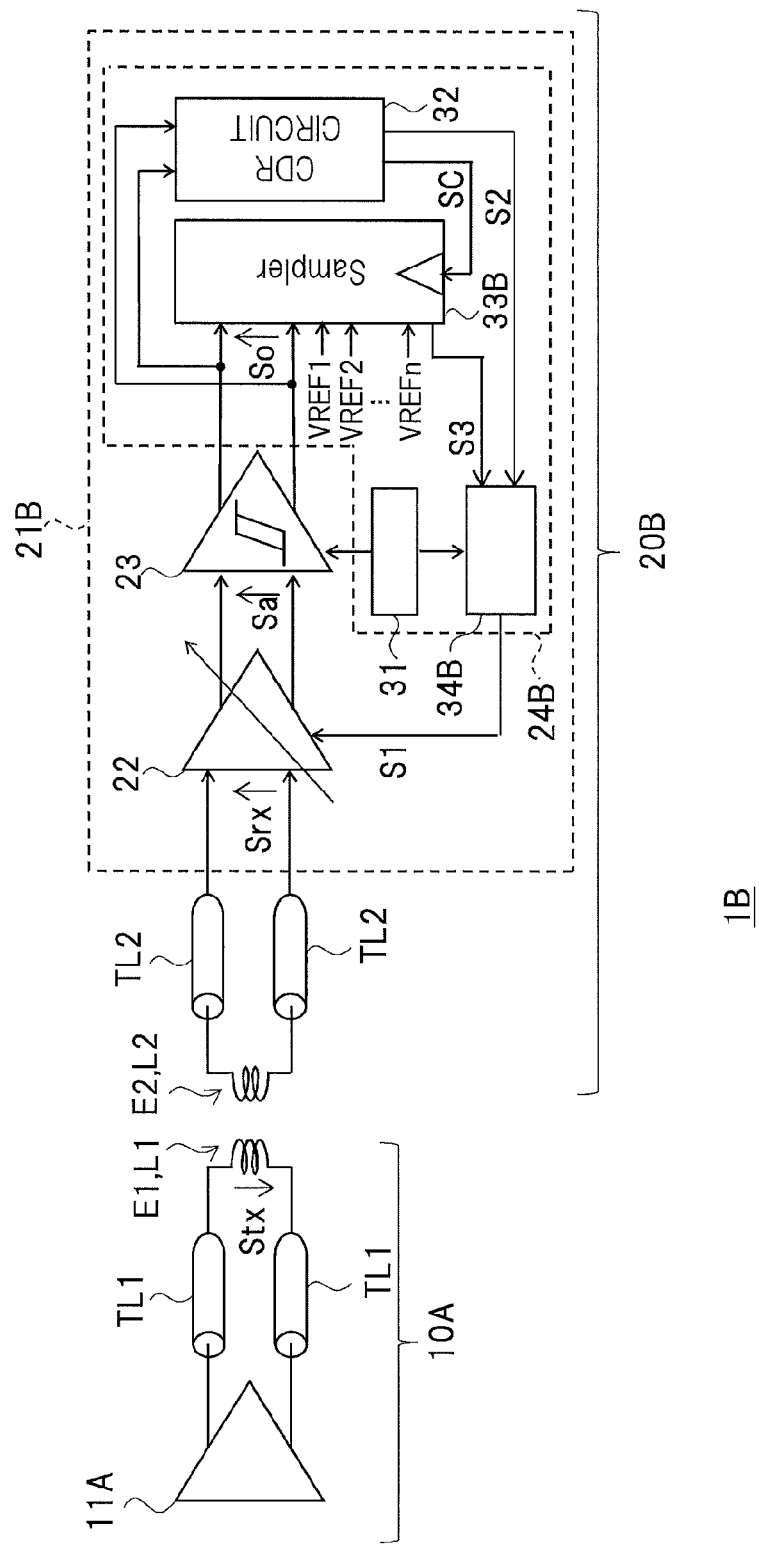
FIG. 10 is a block diagram illustrating a schematic configuration of a communication system according to a third embodiment.

FIG. 10 is a block diagram illustrating a schematic configuration of a communication system 1B according to the third embodiment. In FIG. 10, a configuration part common to FIG. 6 is denoted with the same reference sign, and hereinafter, different points will be mainly described.

In a receiver 20B, functions of a sampler 33B and a third control circuit 34B of a first control circuit 24B of a reception circuit 21B are different from those of FIG. 6.

The sampler 33B samples an output signal So in synchronization with a sampling clock signal SC, compares a sampled value and each of the plurality of reference voltages VREF1 to VREFn (n is an integer of 2 or more), and output a comparison result S3. The reference voltages VREF1 to VREFn are mutually different. An intermediate value between a maximum value and a minimum value of the reference voltages VREF1 to VREFn is set to a value close to a reference amplitude Aref.

A comparison result S3 indicates which of the reference voltages VREF1 to VREFn the value of the sampled output signal So is close to. That is, the reference voltage identified with the comparison result S3 corresponds to an approximate value of an amplitude of the output signal So.

The third control circuit 34B controls a gain of a variable gain amplifier 22 according to a difference between the identified reference voltage and the reference amplitude Aref in accordance with the comparison result S3. The third control circuit 34B controls the gain in accordance with the comparison result S3 of when the output signal So is positive, based on a polarity signal S2, similarly to the second embodiment. Accordingly, the amplitude of the amplified signal Sa approximates the reference amplitude Aref. Accuracy of the control can be further improved as n is larger.

According to the present embodiment, the approximate value of the amplitude of the amplified signal Sa can be obtained by one time sampling and comparison. Therefore, the amplitude of the amplified signal Sa can be caused to approximate the reference amplitude Aref without performing a plurality of times of sampling and comparison. Therefore, the gain can be controlled in a shorter time than the second embodiment. Further, the effect of the second embodiment can be obtained.

Note that the sampler 33B may sample the output signal So only with a rising edge of a sampling clock signal SC.

(Fourth Embodiment)

A fourth embodiment is different from the first embodiment in that a threshold voltage of a hysteresis circuit 23C is controlled.

Figure 11:
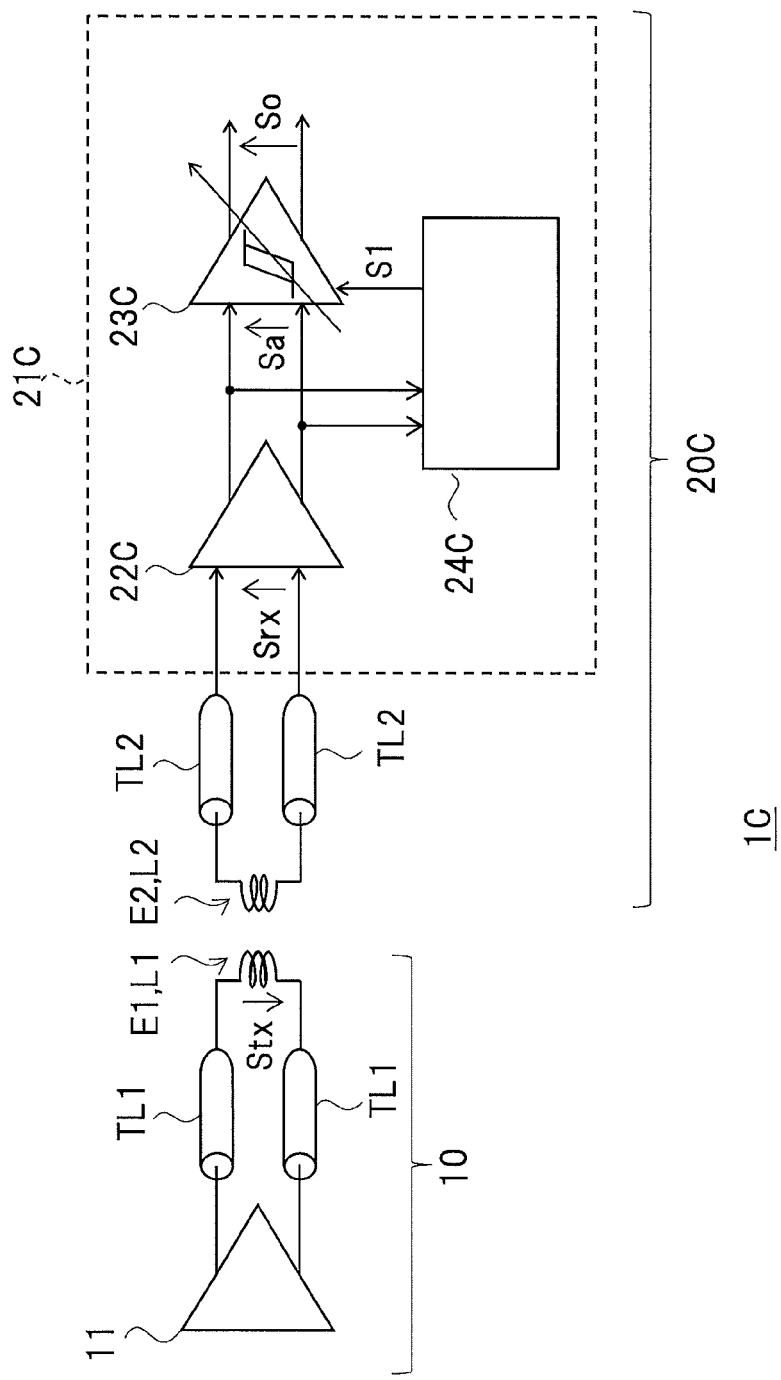
FIG. 11 is a block diagram illustrating a schematic configuration of a communication system according to a fourth embodiment.

FIG. 11 is a block diagram illustrating a schematic configuration of a communication system 1C according to the fourth embodiment. In FIG. 11, a configuration part common to FIG. 1 is denoted with the same reference sign, and hereinafter, different points will be mainly described.

In a receiver 20C, a function of a reception circuit 21C is different from that of FIG. 1. The reception circuit 21C includes an amplifier 22C, the hysteresis circuit 23C, and a first control circuit 24C.

The amplifier 22C amplifies a reception signal Srx with a predetermined gain, and output an amplified signal Sa.

In the hysteresis circuit 23C, a first threshold voltage Vth and a second threshold voltage (-Vth) are variable, in addition to the function of the hysteresis circuit 23 of FIG. 1, and the hysteresis circuit 23C is controlled with a control signal S1.

The first control circuit 24C increases a difference between the first threshold voltage Vth and the second threshold voltage (-Vth), according to an increase in an amplitude of the amplified signal Sa. Meanwhile, the first control circuit 24C decreases a difference between first threshold voltage Vth and the second threshold voltage (-Vth), according to a decrease in the amplitude of the amplified signal Sa.

Accordingly, according to the present embodiment, the first threshold voltage Vth and the second threshold voltage (-Vth) can be set to appropriate values, according to change of amplitudes of the reception signal Srx and the amplified signal Sa. That is, absolute values of the first threshold voltage Vth and the second threshold voltage (-Vth) can be set to appropriate values that are larger than an unnecessary wave Wx such as a noise or a reflected wave, and are smaller than the amplitude of the amplified signal Sa, according to the amplitude of the amplified signal Sa. Therefore, the output signal So can be caused not to be changed based on the unnecessary wave Wx. Therefore, the hysteresis circuit 23C can output an appropriate output signal So even if the amplitudes of the reception signal Srx and the amplified signal Sa are changed. Therefore, a transmitted data pattern can be more accurately restored.

Note that the fourth embodiment may be combined with the first embodiment, and the gain of the variable gain amplifier 22, and the first threshold voltage Vth and the second threshold voltage (-Vth) may be controlled. In this case, for example, first, the gain of the variable gain amplifier 22 is controlled. Then, when a difference between the amplitude of the amplified signal Sa and the reference amplitude Aref exists even if the gain is changed to a maximum value or a minimum value, the first threshold voltage Vth and the second threshold voltage (-Vth) may be further controlled. Accordingly, larger variation of the amplitudes of the reception signal Srx and the amplified signal Sa can be handled.

(Fifth Embodiment)

A fifth embodiment is different from the fourth embodiment in that a threshold voltage is controlled using an output signal So.

Figure 12:
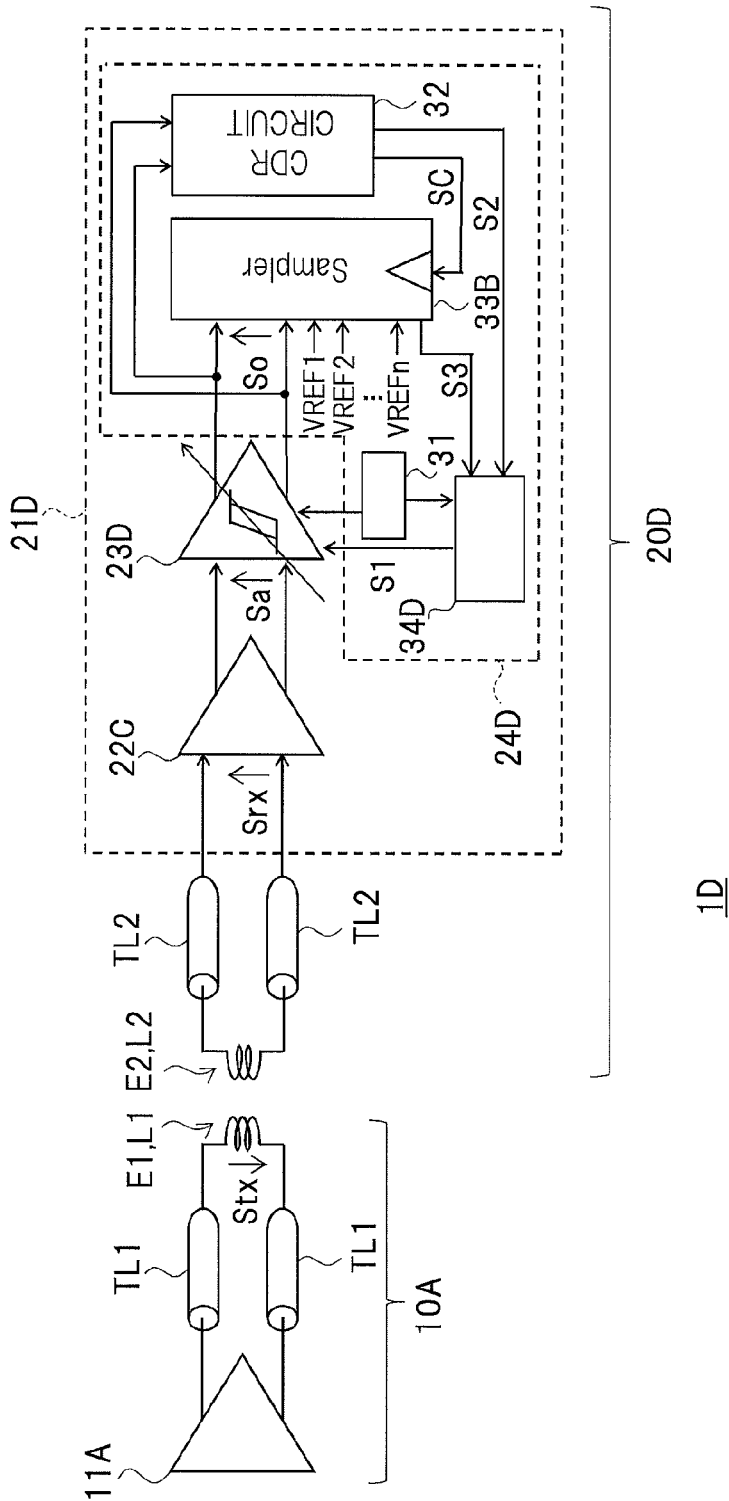
FIG. 12 is a block diagram illustrating a schematic configuration of a communication system according to a fifth embodiment.

FIG. 12 is a block diagram illustrating a schematic configuration of a communication system 1D according to the fifth embodiment. In FIG. 12, a configuration part common to FIGS. 10 and 11 is denoted with the same reference sign, and hereinafter, different points will be mainly described.

A transmission circuit 11A transmits a transmission signal Stx having a clock pattern during a predetermined control period for controlling a first threshold voltage Vth and a second threshold voltage (-Vth). A reception circuit 21D controls threshold voltages, based on the transmission signal Stx having the clock pattern.

In a receiver 20D, functions of a hysteresis circuit 23D and a first control circuit 24D of the reception circuit 21D are different from those of FIG. 11.

The hysteresis circuit 23D has a function of the hysteresis circuit 23 of FIG. 1, and a function of the hysteresis circuit 23C of FIG. 11. That is, the hysteresis circuit 23D can switch a first state and a second state, and the first threshold voltage Vth and the second threshold voltage (-Vth) are variable in the first state.

The first control circuit 24D is the same as the first control circuit 24B of FIG. 10 in a basic configuration, and a function of a third control circuit 34D is different. That is, the third control circuit 34D controls the first threshold voltage Vth and the second threshold voltage (-Vth) in accordance with a comparison result S3 from a sampler 33B. Similarly to the third embodiment, a reference voltage identified with the comparison result S3 corresponds to an amplitude of an output signal So, that is, an approximate value of an amplitude of an amplified signal Sa.

Therefore, the first control circuit 24D increases a difference between the first threshold voltage Vth and the second threshold voltage (-Vth) according to an increase in the amplitude of the amplified signal Sa. Meanwhile, the first control circuit 24D decreases a difference between the first threshold voltage Vth and the second threshold voltage (-Vth) according to a decrease in the amplitude of the amplified signal Sa.

Accordingly, similarly to the fourth embodiment, values of the first threshold voltage Vth and the second threshold voltage (-Vth) can be appropriately set according to change of the amplitudes of the reception signal Srx and the amplified signal Sa.

As described above, according to the present embodiment, the effect of the fourth embodiment can be obtained.

(Sixth Embodiment)

A sixth embodiment is different from the first embodiment in that an amplitude of a transmission signal Stx and the like are controlled.

Figure 13:
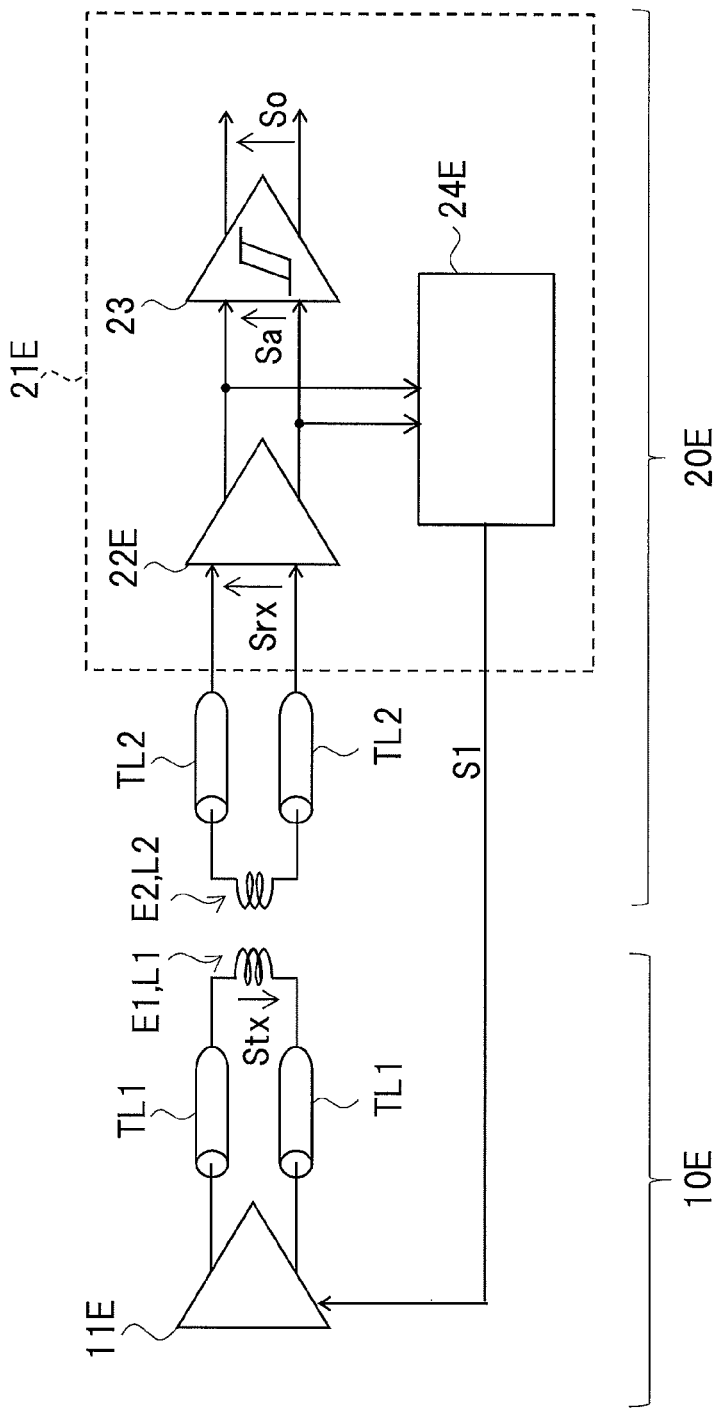
FIG. 13 is a block diagram illustrating a schematic configuration of a communication system according to a sixth embodiment.

FIG. 13 is a block diagram illustrating a schematic configuration of a communication system 1E according to the sixth embodiment. In FIG. 13, a configuration part common to FIG. 1 is denoted with the same reference sign, and hereinafter, different points will be mainly described.

A transmission circuit 11E of a transmitter 10E changes at least either an amplitude Atx of the transmission signal Stx or a transition time tt of a signal level of the transmission signal Stx, according to a control signal S1, in addition to the function of the transmission circuit 11 of FIG. 1. The amplitude Atx of the transmission signal Stx and the transition time tt are those illustrated in FIG. 2.

A reception circuit 21E of a receiver 20E is different from that of FIG. 1 in that an amplifier 22E is provided in place of the variable gain amplifier 22, and in a function of a first control circuit 24E.

The amplifier 22E amplifies a reception signal Srx with a predetermined gain, and outputs an amplified signal Sa.

The first control circuit 24E controls at least either the amplitude Atx of the transmission signal Stx or the transition time tt according to the control signal S1 so that an amplitude of the amplified signal Sa approximates a reference amplitude Aref. By control of both of the amplitude Atx and the transition time tt, a wider range of the amplitude of the amplified signal Sa can be adjusted.

Accordingly, even if the amplitude Atx of the transmission signal Stx, the transition time tt, a coupling coefficient, a gain of the amplifier 22E, and the like vary due to various causes, the variation can be caused not to influence the amplitude of the amplified signal Sa.

That is, since the amplitude of the amplified signal Sa becomes nearly constant, optimum first threshold voltage Vth and second threshold voltage (−Vth) do not depend on the variation. Therefore, a hysteresis circuit 23 can output an appropriate output signal So. Therefore, a transmitted data pattern can be more accurately restored.

Note that the sixth embodiment may be combined with at least one of the first and fourth embodiments. Accordingly, larger variation of the amplitude Atx of the transmission signal Stx and the like can be handled.

(Seventh Embodiment)

A seventh embodiment is different from the sixth embodiment in that a transmission signal Stx is controlled using an output signal So.

Figure 14:
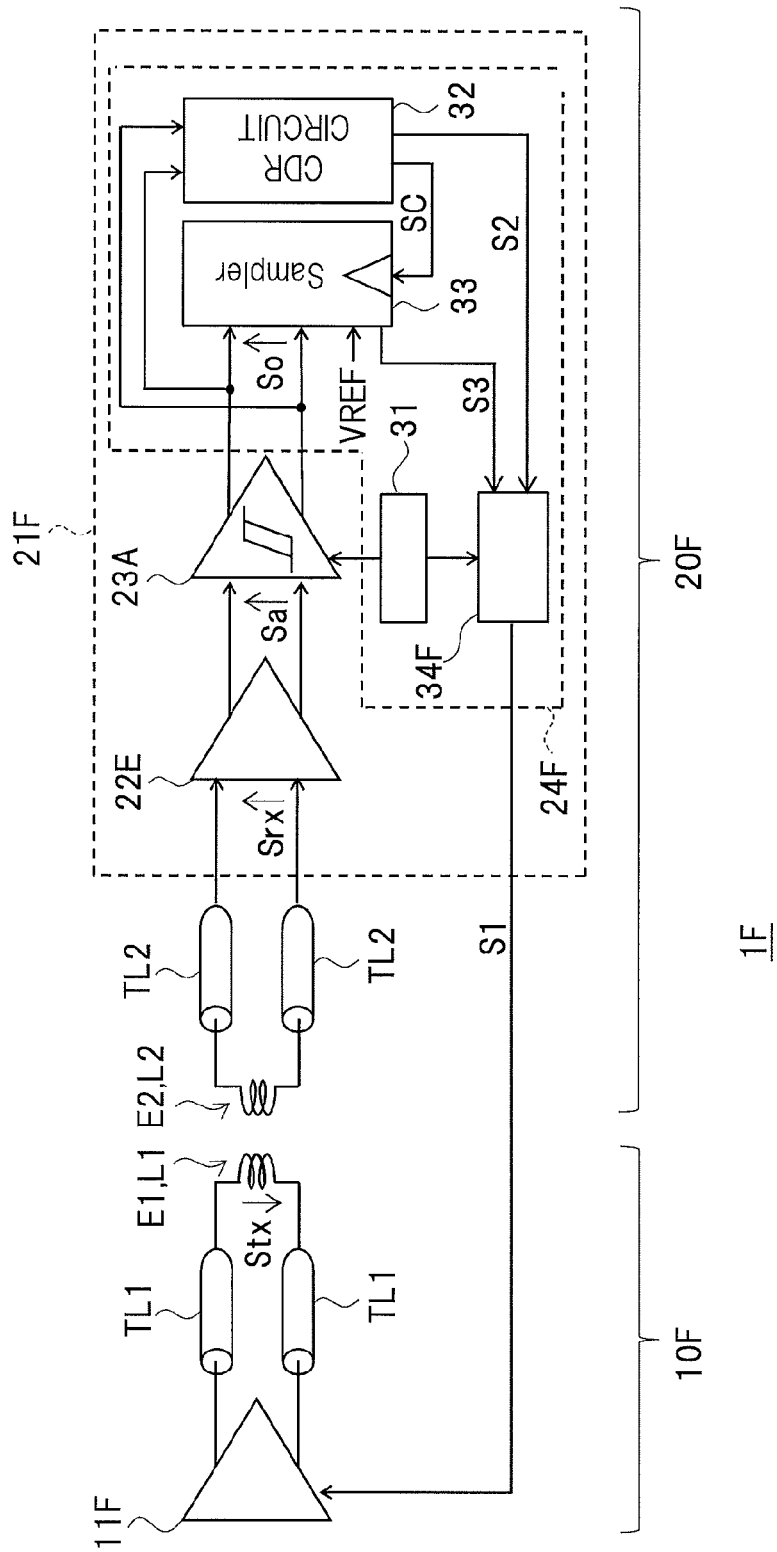
FIG. 14 is a block diagram illustrating a schematic configuration of a communication system according to a seventh embodiment.

FIG. 14 is a block diagram illustrating a schematic configuration of a communication system 1F according to the seventh embodiment. In FIG. 14, a configuration part common to FIGS. 6 and 13 is denoted with the same reference sign, and hereinafter, different points will be mainly described.

A transmission circuit 11F of a transmitter 10F transmits the transmission signal Stx having a clock pattern during a control period for transmitting at least either an amplitude Atx of the transmission signal Stx or a transition time tt, in addition to the function of the transmission circuit 11E of FIG. 13. The clock pattern is the same as that of the second embodiment.

A reception circuit 21F of a receiver 20F is different from that of FIG. 13 in that the hysteresis circuit 23A of FIG. 6 of the second embodiment is provided in place of the hysteresis circuit 23, and in a function of a first control circuit 24F.

The first control circuit 24F is the same as the first control circuit 24A of FIG. 6 of the second embodiment in a basic configuration, and a function of a third control circuit 34F is different. That is, the third control circuit 34F controls at least either an amplitude Atx of the transmission signal Stx or a transition time tt with a control signal S1 in accordance with a comparison result S3.

Accordingly, according to the present embodiment, the effect of the sixth embodiment can be obtained.

Note that a sampler 33 may compare a sampled value and a plurality of reference voltages VREF1 to VREFn, similarly to the third embodiment.

(Eighth Embodiment)

An eighth embodiment is different from the first embodiment in using capacitive coupling as AC coupling.

Figure 15:
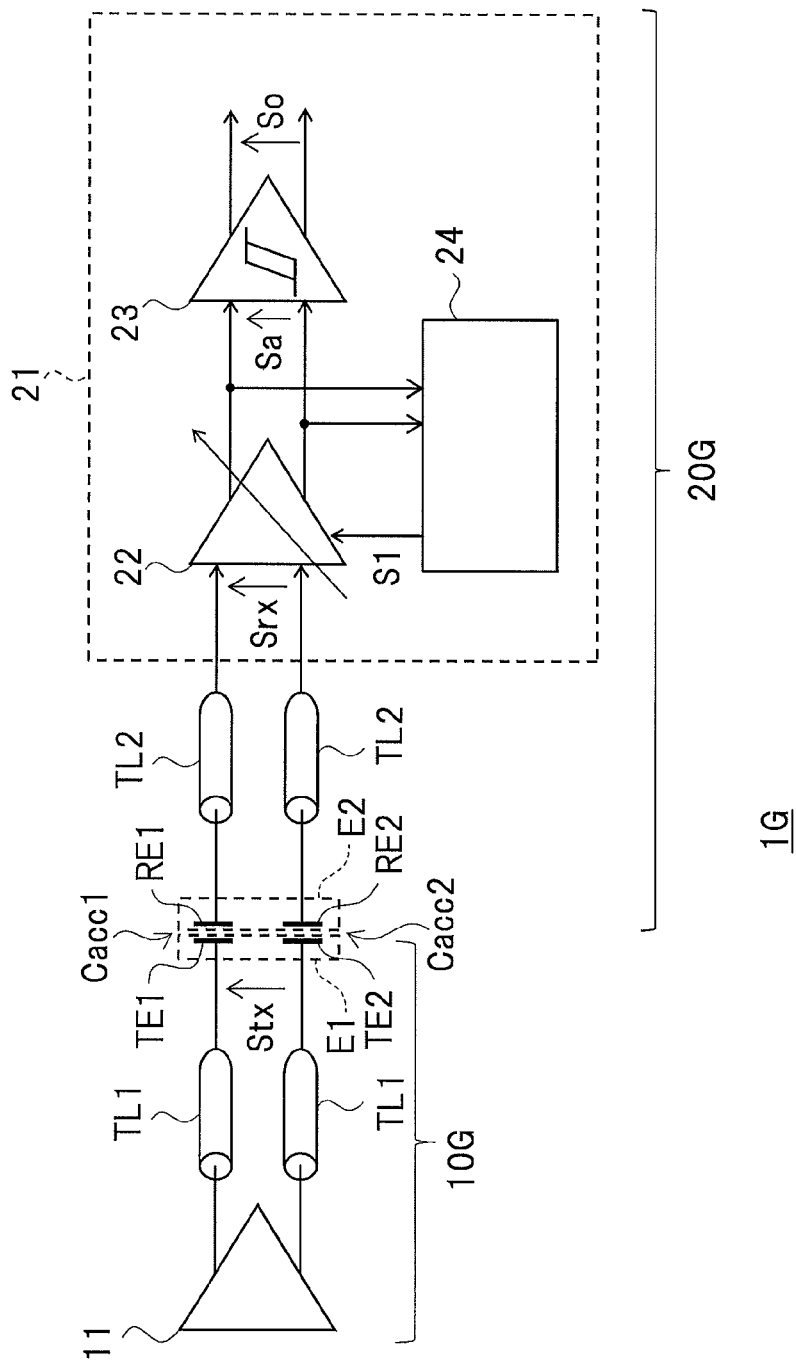
FIG. 15 is a block diagram illustrating a schematic configuration of a communication system according to an eighth embodiment.

FIG. 15 is a block diagrFam illustrating a schematic configuration of a communication system 1G according to the eighth embodiment. In FIG. 15, a configuration part common to FIG. 1 is denoted with the same reference sign, and hereinafter, different points will be mainly described.

A transmitting AC coupling element E1 includes a first transmitting electrode TE1 and a second transmitting electrode TE2. The first transmitting electrode TE1 and the second transmitting electrode TE2 are a thin film metal pattern having an arbitrary shape such as a circle, an ellipse, or a rectangle in plane view, and is provided on a printed circuit board of a transmitter 10G.

One first transmission line TL1 connects a transmission circuit 11 and the first transmitting electrode TE1. The other first transmission line TL1 connects the transmission circuit 11 and the second transmitting electrode TE2.

The transmission circuit 11 transmits a differential transmission signal Stx to a reception circuit 21 of a receiver 20G through the first transmission lines TL1 and TL1, the first transmitting electrode TE1, and the second transmitting electrode TE2. The transmission signal Stx is a voltage.

A receiving AC coupling element E2 includes a first receiving electrode RE1 and a second receiving electrode RE2. The first receiving electrode RE1 and the second receiving electrode RE2 are a thin film metal pattern having an arbitrary shape such as a circle, an ellipse, or a rectangle in a plane view, and is provided on a printed circuit board of the receiver 20G.

One second transmission line TL2 connects the first receiving electrode RE1 and the reception circuit 21. The other second transmission line TL2 connects the second receiving electrode RE2 and the reception circuit 21.

In performing communication, the transmitter 10G and the receiver 20G are closely arranged so that the first transmitting electrode TE1 and the first receiving electrode RE1 are close to each other, and the second transmitting electrode TE2 and the second receiving electrode RE2 are close to each other. A distance between the first transmitting electrode TE1 and the first receiving electrode RE1, and a distance between the second transmitting electrode TE2 and the second receiving electrode RE2 are several mm, for example. With such an arrangement, the first transmitting electrode TE1 is capacitively coupled (AC coupled) to the first receiving electrode RE1, and the second transmitting electrode TE2 is capacitively coupled to the second receiving electrode RE2. A coupling capacitance Cacc1 between the first transmitting electrode TE1 and the first receiving electrode RE1, and a coupling capacitance Cacc2 between the second transmitting electrode TE2 and the second receiving electrode RE2 are several hundred fF to several pF. Accordingly, signals are transmitted from the first transmitting electrode TE1 and the second transmitting electrode TE2 to the first receiving electrode RE1 and the second receiving electrode RE2 through the coupling capacitances Cacc1 and Cacc2.

Such a communication system 1G can perform communication, similarly to the first embodiment, and a similar effect to the first embodiment can be obtained.

Note that the capacitive coupling may be used as the AC coupling in the second to seventh embodiments, similarly to the present embodiment.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A reception circuit configured to receive a reception signal from a transmission circuit through a receiving AC coupling element, the transmission circuit transmitting a transmission signal through a transmitting AC coupling element, the receiving AC coupling element being AC coupled to the transmitting AC coupling element, the reception circuit comprising:
   a variable gain amplifier configured to amplify the reception signal with a variable gain to output an amplified signal;
   a hysteresis circuit having hysteresis in an input/output characteristic, and configured to output an output signal according to the amplified signal; and
   a first control circuit configured to control the gain so that an amplitude of the amplified signal approximates a reference amplitude, wherein
   the transmission circuit transmits the transmission signal having a clock pattern during a control period for controlling the gain,
   the hysteresis circuit is able to switch a first state and a second state, wherein the input/output characteristic has the hysteresis in the first state, and the input/output characteristic does not have the hysteresis and the hysteresis circuit outputs the output signal having an amplitude according to the amplitude of the amplified signal in the second state, and
   the first control circuit comprises
   a second control circuit configured to switch the hysteresis circuit to the second state during the control period,
   a clock data recovery circuit configured to generate an internal clock signal synchronized with the output signal, and to delay the internal clock signal to generate a sampling clock signal,
   a sampler configured to sample the output signal in synchronization with the sampling clock signal, to compare a sampled value and a reference voltage according to the reference amplitude, and to output a comparison result, and
   a third control circuit configured to control the gain in accordance with the comparison result.

2. The reception circuit according to claim 1, wherein
   the clock data recovery circuit delays the internal clock signal so that timing of a rising edge and a falling edge of the sampling clock signal approximates reference timing,
   the reference timing is timing after elapse of a ¼ time of a period of the clock pattern from timing when the output signal is shifted from zero, and
   the period of the clock pattern is determined so that timing when the output signal is maximized approximates the reference timing.

3. A reception circuit configured to receive a reception signal from a transmission circuit through a receiving AC coupling element, the transmission circuit transmitting a transmission signal through a transmitting AC coupling element, the receiving AC coupling element being AC coupled to the transmitting AC coupling element, the reception circuit comprising:
   a variable gain amplifier configured to amplify the reception signal with a variable gain to output an amplified signal;
   a hysteresis circuit having hysteresis in an input/output characteristic, and configured to output an output signal according to the amplified signal; and
   a first control circuit configured to control the gain so that an amplitude of the amplified signal approximates a reference amplitude, wherein
   the transmission circuit transmits the transmission signal having a clock pattern during a control period for controlling the gain,
   the hysteresis circuit is able to switch a first state and a second state, wherein the input/output characteristic has the hysteresis in the first state, and the input/output characteristic does not have the hysteresis and the hysteresis circuit outputs the output signal having an amplitude according to the amplitude of the amplified signal in the second state, and
   the first control circuit comprises
   a second control circuit configured to switch the hysteresis circuit to the second state during the control period,
   a clock data recovery circuit configured to generate an internal clock signal synchronized with the output signal, and to delay the internal clock signal to generate a sampling clock signal,
   a sampler configured to sample the output signal in synchronization with the sampling clock signal, to compare a sampled value and each of a plurality of reference voltages, and to output a comparison result, and
   a third control circuit configured to control the gain in accordance with the comparison result.

4. The reception circuit according to claim 3, wherein
   an intermediate value between a maximum value and a minimum value of the plurality of reference voltages is set to a value close to the reference amplitude.

5. The reception circuit according to claim 1, wherein
   the transmitting AC coupling element is a transmitting inductor,
   the receiving AC coupling element is a receiving inductor, and
   an AC coupling caused by the transmitting AC coupling element and the receiving AC coupling element is inductive coupling.

6. The reception circuit according to claim 1, wherein
   the transmitting AC coupling element is a transmitting electrode,
   the receiving AC coupling element is a receiving electrode, and
   an AC coupling caused by the transmitting AC coupling element and the receiving AC coupling element is capacitive coupling.

7. A reception circuit configured to receive a reception signal from a transmission circuit through a receiving AC coupling element, the transmission circuit transmitting a transmission signal through a transmitting AC coupling element, the receiving AC coupling element being AC coupled to the transmitting AC coupling element, the reception circuit comprising:
   an amplifier configured to amplify the reception signal to output an amplified signal;
   a hysteresis circuit having hysteresis in an input/output characteristic, and configured to compare the amplified signal, a first threshold voltage, and a second threshold voltage lower than the first threshold voltage, and to output an output signal according to a comparison result, the first threshold voltage and the second threshold voltage being variable; and a first control circuit configured to increase a difference between the first threshold voltage and the second threshold voltage according to an increase in an amplitude of the amplified signal, and to decrease the difference between the first threshold voltage and the second threshold voltage according to a decrease in the amplitude of the amplified signal.

8. The reception circuit according to claim 7, wherein
the transmission circuit transmits the transmission signal having a clock pattern during a control period for controlling the first threshold voltage and the second threshold voltage,
the hysteresis circuit is able to switch a first state and a second state, wherein the input/output characteristic has the hysteresis in the first state, and the input/output characteristic does not have the hysteresis and the hysteresis circuit outputs the output signal having an amplitude according to the amplitude of the amplified signal in the second state, and
the first control circuit comprises
a second control circuit configured to switch the hysteresis circuit to the second state during the control period,
a clock data recovery circuit configured to generate an internal clock signal synchronized with the output signal, and to delay the internal clock signal to generate a sampling clock signal,
a sampler configured to sample the output signal in synchronization with the sampling clock signal, to compare a sampled value and each of a plurality of reference voltages, and to output a comparison result, and
a third control circuit configured to control the first threshold voltage and the second threshold voltage in accordance with the comparison result.

9. The reception circuit according to claim 8, wherein
the clock data recovery circuit delays the internal clock signal so that timing of a rising edge and a falling edge of the sampling clock signal approximates reference timing,
the reference timing is timing after elapse of a ¼ time of a period of the clock pattern from timing when the output signal is shifted from zero, and
the period of the clock pattern is determined so that timing when the output signal is maximized approximates the reference timing.

10. The reception circuit according to claim 7, wherein
the transmitting AC coupling element is a transmitting inductor,
the receiving AC coupling element is a receiving inductor, and
an AC coupling caused by the transmitting AC coupling element and the receiving AC coupling element is inductive coupling.

11. The reception circuit according to claim 7, wherein
the transmitting AC coupling element is a transmitting electrode,
the receiving AC coupling element is a receiving electrode, and
an AC coupling caused by the transmitting AC coupling element and the receiving AC coupling element is capacitive coupling.

12. A communication system comprising:
a transmitting AC coupling element;
a transmission circuit configured to transmit a transmission signal through the transmitting AC coupling element;
a receiving AC coupling element to be AC coupled to the transmitting AC coupling element; and
a reception circuit configured to receive a reception signal through the receiving AC coupling element, wherein
the transmission circuit changes at least either an amplitude of the transmission signal or a transition time of a signal level of the transmission signal, and
the reception circuit comprises
an amplifier configured to amplify the reception signal to output an amplified signal,
a hysteresis circuit having hysteresis in an input/output characteristic, and configured to output an output signal according to the amplified signal, and
a first control circuit configured to control at least either the amplitude of the transmission signal or the transition time so that an amplitude of the amplified signal approximates a reference amplitude.

13. The communication system according to claim 12, wherein
the transmission circuit transmits the transmission signal having a clock pattern during a control period for controlling at least either the amplitude of the transmission signal or the transition time,
the hysteresis circuit is able to switch a first state and a second state, wherein the input/output characteristic has the hysteresis in the first state, and the input/output characteristic does not have the hysteresis and the hysteresis circuit outputs the output signal having an amplitude according to the amplitude of the amplified signal in the second state, and
the first control circuit comprises
a second control circuit configured to switch the hysteresis circuit to the second state during the control period,
a clock data recovery circuit configured to generate an internal clock signal synchronized with the output signal, and to delay the internal clock signal to generate a sampling clock signal,
a sampler configured to sample the output signal in synchronization with the sampling clock signal, to compare a sampled value and a reference voltage according to the reference amplitude, and to output a comparison result, and
a third control circuit configured to control at least either the amplitude of the transmission signal or the transition time according to the comparison result.

14. The communication system according to claim 13, wherein
the clock data recovery circuit delays the internal clock signal so that timing of a rising edge and a falling edge of the sampling clock signal approximates reference timing,
the reference timing is timing after elapse of a ¼ time of a period of the clock pattern from timing when the output signal is shifted from zero, and
the period of the clock pattern is determined so that timing when the output signal is maximized approximates the reference timing.

15. The communication system according to claim 12, wherein
the transmission circuit transmits the transmission signal having a clock pattern during a control period for controlling at least either the amplitude of the transmission signal or the transition time,
the hysteresis circuit is able to switch a first state and a second state, wherein the input/output characteristic has the hysteresis in the first state, and the input/output characteristic does not have the hysteresis and the hysteresis circuit outputs the output signal having an amplitude according to the amplitude of the amplified signal in the second state, and the first control circuit comprises a second control circuit configured to switch the hysteresis circuit to the second state during the control period, a clock data recovery circuit configured to generate an internal clock signal synchronized with the output signal, and to delay the internal clock signal to generate a sampling clock signal, a sampler configured to sample the output signal in synchronization with the sampling clock signal, to compare a sampled value and each of a plurality of reference voltages, and to output a comparison result, and a third control circuit configured to control at least either the amplitude of the transmission signal or the transition time according to the comparison result.

16. The communication system according to claim 15, wherein an intermediate value between a maximum value and a minimum value of the plurality of reference voltages is set to a value close to the reference amplitude.

17. The communication system according to claim 12, wherein the transmitting AC coupling element is a transmitting inductor, the receiving AC coupling element is a receiving inductor, and an AC coupling caused by the transmitting AC coupling element and the receiving AC coupling element is inductive coupling.

18. The communication system according to claim 12, wherein the transmitting AC coupling element is a transmitting electrode, the receiving AC coupling element is a receiving electrode, and an AC coupling caused by the transmitting AC coupling element and the receiving AC coupling element is capacitive coupling.

19. The communication system according to claim 3, wherein the transmitting AC coupling element is a transmitting inductor, the receiving AC coupling element is a receiving inductor, and an AC coupling caused by the transmitting AC coupling element and the receiving AC coupling element is inductive coupling.

20. The reception circuit according to claim 3, wherein the transmitting AC coupling element is a transmitting electrode, the receiving AC coupling element is a receiving electrode, and an AC coupling caused by the transmitting AC coupling element and the receiving AC coupling element is capacitive coupling.

* * * * *